No. 742,505. PATENTED OCT. 27, 1903.
P. T. SIEVERT.
GLASS BLOWING APPARATUS.
APPLICATION FILED FEB. 20, 1903.
NO MODEL. 4 SHEETS—SHEET 1.

WITNESSES:
W. M. Avery
A. H. Davis

INVENTOR
Paul Theodor Sievert
BY
ATTORNEYS.

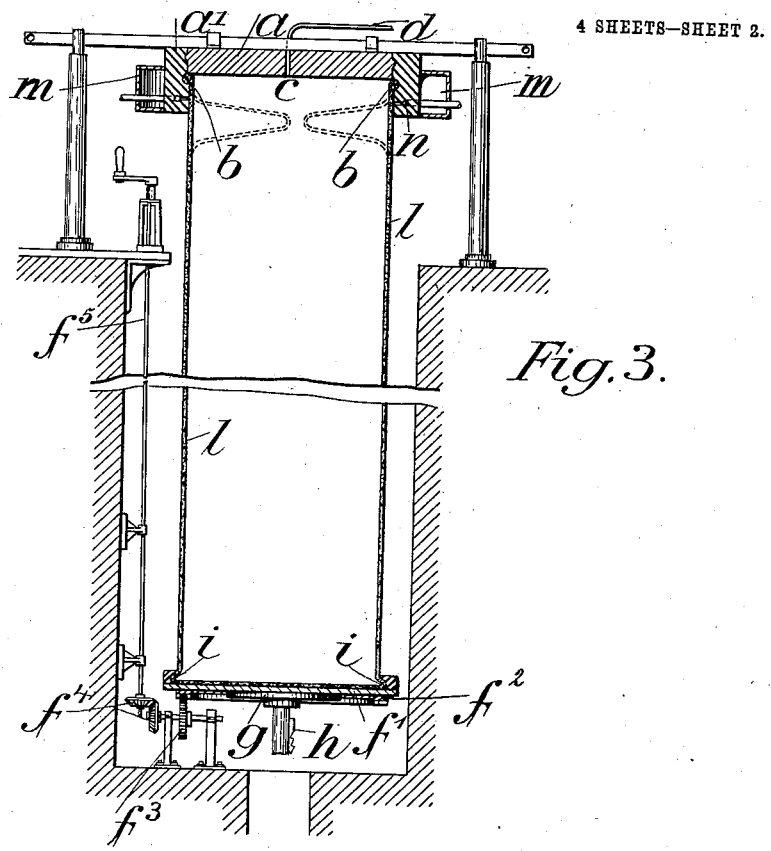
No. 742,505. PATENTED OCT. 27, 1903.
P. T. SIEVERT.
GLASS BLOWING APPARATUS.
APPLICATION FILED FEB. 20, 1903.
NO MODEL. 4 SHEETS—SHEET 2.
Fig. 3.
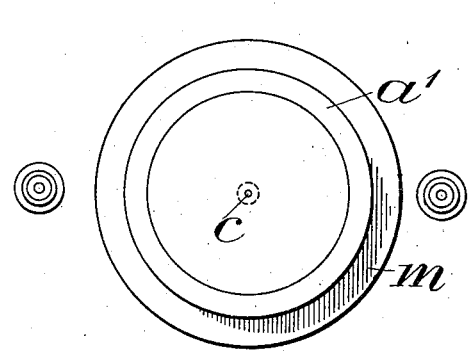
Fig. 4.
WITNESSES:
W. M. Avery
A. C. Davis
INVENTOR
Paul Theodor Sievert
BY
ATTORNEYS.

No. 742,505. PATENTED OCT. 27, 1903.
P. T. SIEVERT.
GLASS BLOWING APPARATUS.
APPLICATION FILED FEB. 20, 1903.
NO MODEL. 4 SHEETS—SHEET 3.

WITNESSES: INVENTOR
Paul Theodor Sievert
BY
ATTORNEYS.

No. 742,505. PATENTED OCT. 27, 1903.
P. T. SIEVERT.
GLASS BLOWING APPARATUS.
APPLICATION FILED FEB. 20, 1903.
NO MODEL. 4 SHEETS—SHEET 4.

WITNESSES:
W. M. Avery
A. C. Davis

INVENTOR
Paul Theodor Sievert
BY
Munn
ATTORNEYS.

No. 742,505. Patented October 27, 1903.

UNITED STATES PATENT OFFICE.

PAUL THEODOR SIEVERT, OF DRESDEN, GERMANY.

GLASS-BLOWING APPARATUS.

SPECIFICATION forming part of Letters Patent No. 742,505, dated October 27, 1903.

Application filed February 20, 1903. Serial No. 144,289. (No model.)

*To all whom it may concern:*

Be it known that I, PAUL THEODOR SIEVERT, a subject of the German Emperor, residing at Dresden, in the Kingdom of Saxony, Germany, have invented a new and Improved Glass-Blowing Apparatus, of which the following is a full, clear, and exact description.

The object of the invention is to provide a new and improved glass-blowing apparatus, more especially designed for manufacturing glass articles such as vessels of cylindrical or other shape and hollow glass bodies to be subsequently formed into sheet or window glass, the apparatus being arranged to insure a proper distribution of the glass material to produce articles having walls of uniform thickness.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
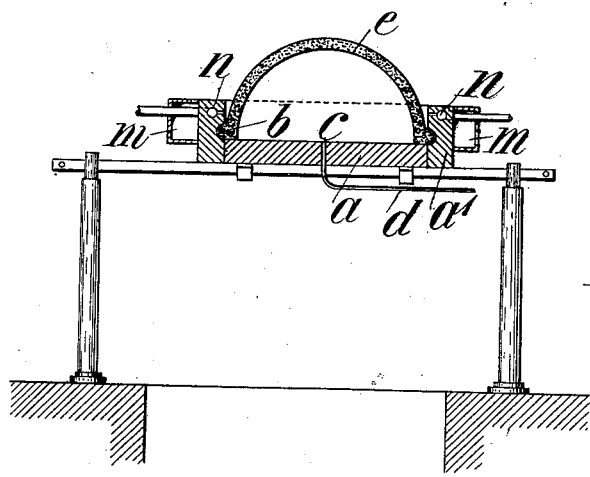
Figure 2:
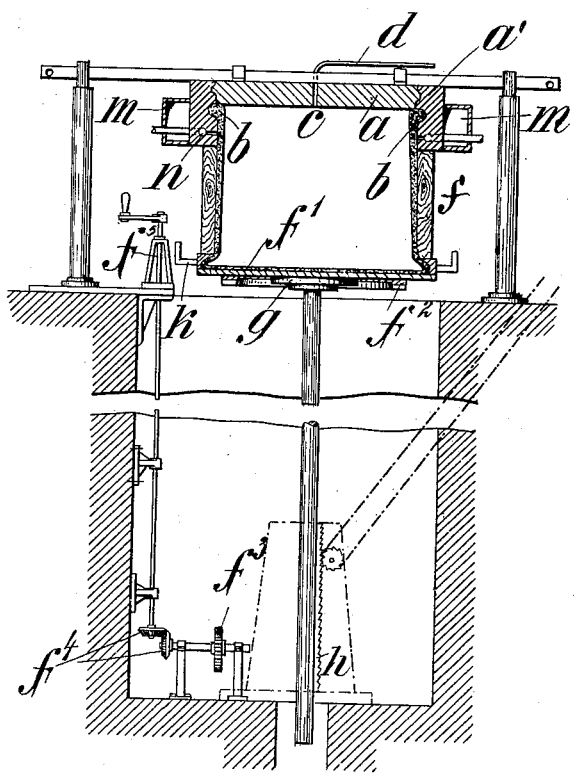
Figure 5:
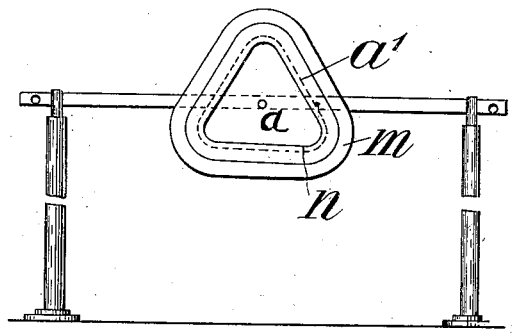
Figure 6:
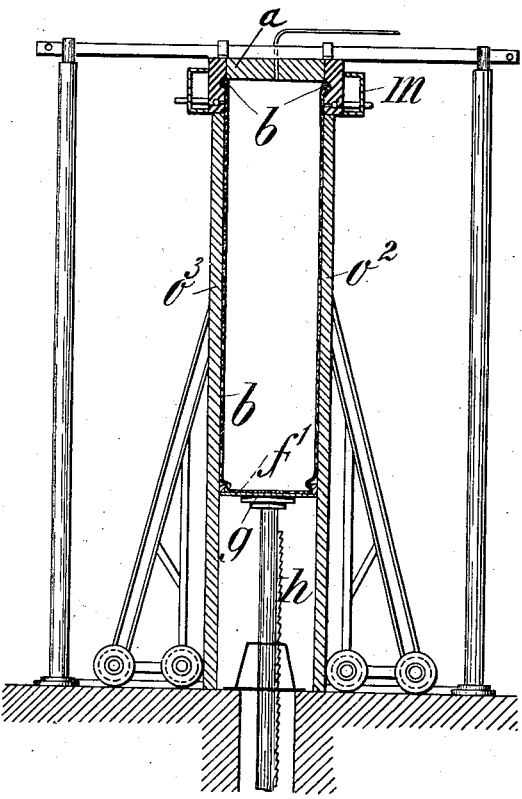
Figure 9:
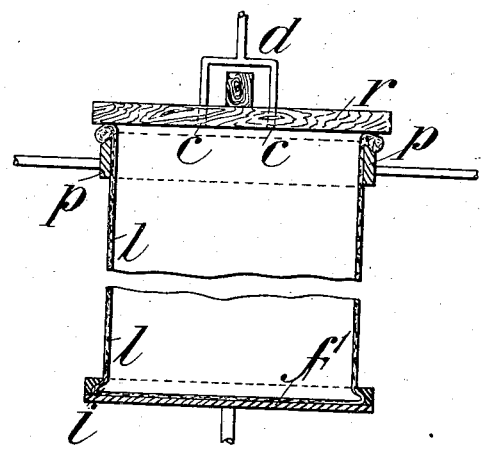
Figure 8:
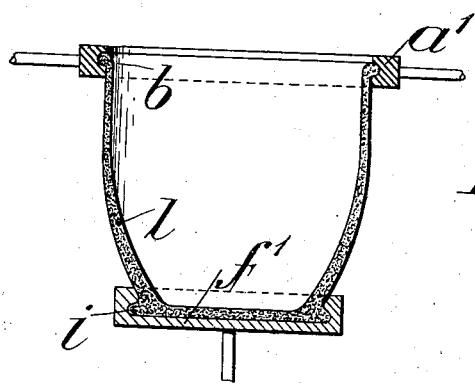
Figure 7:
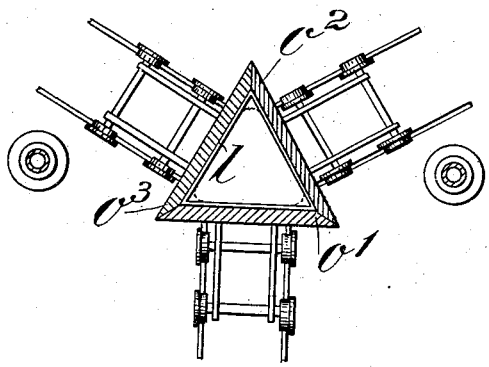

Figure 1 is a sectional side elevation of the apparatus, showing the formation of the flat layer or slab of hot plastic glass into a hollow body. Fig. 2 is a similar view of the same, showing the hollow body connected with the pulling device. Fig. 3 is a like view of the same, showing the parts in a final position. Fig. 4 is a plan view of the apparatus shown in Fig. 1. Fig. 5 is a side elevation of the preliminary mold employed for forming triangular hollow bodies. Fig. 6 is a sectional side elevation of the apparatus for forming triangular hollow bodies. Fig. 7 is a sectional plan view of the same. Fig. 8 is a sectional side elevation of the apparatus for forming vessels, and Fig. 9 is a sectional side elevation of a modified form of the apparatus for forming hollow bodies.

My invention relates principally to improvements in machinery and appliances adapted to carrying on that special process of sheet or window glass manufacture in which the molten mass is spread upon a table, held firmly at its outer rim, preliminarily blown into a convenient form, either in the open air or in suitable mold, and then further blown out to any desired size, shape, and thickness, whether for the purpose of eventually slitting and spreading the resulting hollow body into one or more sheets or for the purpose of forming vessels of cylindrical or other form without such opening and spreading.

I may remark preliminarily that there are already known machinery and appliances which produce glass cylinders from which sheets are eventually made, such machinery and appliances consisting of a perforated table upon which melted glass is spread in a thin layer and of a frame by means of which it is held while it is blown out either unconfined in the open air or confined in molds; but in blowing very long and thin glass bodies in this manner by the aid of such machinery and appliances a perfectly even distribution of the material, especially as regards the thickness of the walls, is not always attainable. The melted glass has the tendency, especially at high temperature, to run toward the lower portion of the cylinder or other hollow subject, and where large bodies, such as cylinders for sheet-glass, are blown in the open air there is frequently in addition an undesired ballooning or bellying of the sides. The herein-described machinery and appliances do away with these objections in that there is a preliminary mold having depressions in its outer rim adjacent to the bottom and into which the molten glass is first blown into a hollow object of cylindrical or other form having projections that enter into and hold fast to the said depressions in the bottom of the preliminary mold, so that the hollow cylinder or other glass object may then be further and finally expanded to the desired shape by gas or air pressure aided by withdrawal of the movable bottom of the preliminary mold. There are, further, for the separation of the finished article from the mold a burner or heater for first resoftening the glass rim or border by which it is held at one end and means for rotating the lower end of the glass article, whereby the resoftened glass is twisted so as to form a thin rope-like portion that may be easily severed by shears.

*a* is a horizontal slab or plate having perforations through its thickness or with open center; $a'$, a frame surrounding this slab; $b$, an annular groove therein; $c$, an orifice for admission of air or gas under pressure; $d$, a pipe conveying the air or gas; $e$, a "balloon" cylinder or other hollow glass body being blown; $f$, a preliminary mold in which this body is formed; $f'$, the bottom of this preliminary mold; $f^2$, a circular rack; $f^3$, a pinion adapted to mesh therewith and drive it; $f^4$, miter or bevel wheels on the vertical shaft $f^5$ and on the shaft of the pinion $f^3$; $g$, a horizontal rotatable plate supporting the bottom $f'$ of the mold; $h$, a vertical rack which raises and lowers this latter; $i$, the grooved rim of the bottom $f'$.

$k$ indicates two handles which serve as means for rotating the bottom $f'$. These handles may be attached in any manner that will adapt them to be detached.

$l$ indicates the side walls of the cylinder being blown; $m$, a heater surrounding the slab $a$; $n$, a jet gas-burner.

Figs. 1 to 4, inclusive, represent the formation of a hollow glass object in the open air. The molten glass is in this case cast in the usual manner upon a round table or slab $a$, the center of which has an opening. Here it spreads out rapidly and fills the groove $b$, in which it holds fast during the blowing operation. As soon as the cast glass slab is sufficiently cooled, air or gas under pressure is admitted by the pipe $d$ and the orifice $c$ for blowing up the mass into a cylinder, balloon, or other form. According as it is desired that the bottom of the form thus produced be thick or thin is the balloon or the cylinder $e$ made thicker or thinner. This can easily be regulated by blowing less or more rapidly. The more rapid the blowing the thinner the side walls and the more the glass flows toward the rim of the body $e$, as seen in Fig. 1. The form shown as an example is suitable for the production of a cylinder for sheet-glass in which there is no special advantage in having a thin bottom, as it is to be split open. As soon as the balloon or other shape has attained a sufficient length it is rotated through an angle of one hundred and eighty degrees about its vertical axis upon the slab $a$, and at the same time the preliminary mold $f$ is firmly held against the borders of the plate $a$, as shown in Fig. 2. This preliminary mold $f$ rests upon the rotatable bottom $f'$, which, as shown, can be raised and lowered by a rack $h$ and corresponding pinion. Not only the side walls of the preliminary mold $f$ but also its bottom $f'$ consist of separate parts, so that they can be opened out sidewise. The bottom $f'$ is held firmly on the plate or slab $g$, and there is a continuous molding around the outer edge, as shown in Fig. 2. As soon as the preliminary mold $f$ is united with the slab or plate $a$ the balloon or body is further expanded by air or gas under pressure until it touches the side walls of the preliminary mold $f$ and completely covers the bottom $f'$. Then the plate $g$ and the preliminary mold $f$ can be rotated about their vertical axis by the handle $k$ in order to prevent the formation of seams or other imperfections in the blown-out article. This rotation is performed where it is desired to make cylinders with smooth outer surfaces. When the preliminary mold is completely filled, its side walls are removed and the mold-bottom $f'$ is lowered by the rack $h$ and its corresponding pinion. During this lowering the blowing is further continued, the attainment of the desired result being facilitated by the glass being firmly held in the rim $i$ of the mold-bottom $f'$, which renders the distribution of the soft material more even and prevents bellying out of the side walls $l$ of the cylinder.

Where cylinders for sheet-glass are to be made, as shown in Fig. 3 in cross-section and Fig. 4 in ground plan, the glass should be blown as thin as possible in the rim $i$ of the bottom $f'$. There usually results in this case in the blowing operation a spontaneous separation of the glass bottom from the side walls of the article, and if not such separation may readily be accomplished later, thus saving labor and lessening the loss from breakage.

On the frame $a'$ of the slab $a$ there is a heater $m$, kept hot by charcoal or other suitable fuel. This heater has for its object to prevent the temperature of the glass mass on the frame $a'$ from sinking below a given point, so that it will be kept hot enough to enable it to be easily blown and expanded in a cylinder or other shape.

In the frame $a'$ there is a burner $n$, which emits pointed flames or jets, preferably of a mixture of air and inflammable gas. This retards the cooling action of the air upon the surface of the glass which lies upon the frame $a'$. There can also be effected during the formation of the glass balloon or cylinder a warming to any desired extent, by means of this burner $n$, of the glass mass upon the frame $a'$ of the slab $a$, and finally the upper border of the completed balloon or cylinder can be so softened that the thick rim in the groove $b$ of the frame $a'$ can be readily cut off by shears or torn off by rapid pulling down. In separating by pulling, the plate $g$ and the cylinder can be rotated, which produces a spiral twisting of the soft upper parts of the cylinder, as shown in Fig. 3 by dotted lines. There results a surplus or end piece that is connected to the cylinder by a twisted glass thread or rope, which latter can be cut so as to separate the cylinder from the end piece.

The rotation of the disk $f'$, which holds the lower border of the hollow glass object, may be effected by any desirable means. In the manner shown in Fig. 3 the lower side of the disk $f'$ is provided with a circular rack which in the lowest position of the disk meshes with the toothed pinion $f^3$, which latter is actuated by the conical gear-wheels $f^4$ and the shaft $f^5$.

When it is desired to make hollow glass vessels by means of this apparatus, the bottom of the balloon is made thick, and in many cases the rim at the upper edge is not separated. In Fig. 8 is shown the formation of a vessel that has a bottom of diameter smaller than that of the opening in the vessel, while in the formation of cylinders for making sheet-glass it is always best to give the bottom a diameter like the upper edge of the cylinder. This permits the most favorable distribution of the glass, as the pulling then acts uniformly upon the glass walls.

In Figs. 5 to 7 I show a modified form of the apparatus, of which a triangular or prismatic finishing-mold forms a part, the operations of blowing and pulling being, however, employed as before. A hollow glass prism is formed, which is to be cut in the usual manner into three sheets. In this case a triangular slab with a central hole is used, as shown in plan, Fig. 5. Fig. 6 illustrates in cross-section, and Fig. 7 in plan, the blowing and pulling of the hollow triangular glass prism in the finishing-mold. This latter mold consists of three parts $o'$ $o^2$ $o^3$, which are brought up to the sides upon wheels and which are withdrawn from the slab $a$ while the molten glass is being cast upon the slab and blown into the preliminary mold. The inner surfaces of the preliminary mold are, if of metal, polished and where desired nickel-plated or covered with wet paper. They can, however, consist of polished plates of earthenware or other ceramic material.

The glass balloon $e$ necessary to the formation of the hollow triangular glass prism is formed as shown in Fig. 1. The preliminary blowing of this hollow body is effected in a triangular prismatic preliminary mold in the same manner as shown in Fig. 2; but in this case a rotation of the preliminary mold is not possible. As soon as the preliminary blowing is completed and the side walls of the preliminary mold $f$ (which is employed as in the case before described) have been removed, the parts $o'$ $o^2$ $o^3$ of the final mold are brought up close to the slab $a$, so that together with this they make a closed mold in which is guided the triangular bottom $f'$, that is held fast on the slab $g$, which latter can be raised and lowered by the rack $h$ and its corresponding pinion. The bottom $f'$ consists of several parts, so that it can be opened sidewise. The preliminarily-blown glass body is elongated by lowering the plate $g$ with the bottom $f'$ within the finishing-mold, while at the same time air or gas is blown in. This effects the expansion of the mass until it lies close to all the smooth inner surfaces of the finishing-mold. While the plate or slab $a$ and the bottom $f'$ have rounded corners, the finishing-mold has internally sharp edges, so that the hollow glass triangular prism which is first formed with rounded edges is forced by the pressure of the air or gas to assume sharp ones, as shown in Fig. 7. Thus there results such a thinning of the hollow glass prism at the edges that it will either be entirely burst through at these edges or rendered very thin there. The resulting sharp-edged hollow triangular glass prism can therefore very readily be separated into three flat sheets, if not already so separated. In this matter it is to be understood that the prism is readily divided lengthwise along the line of its angles, or in case the prism is very thin the angles may split or separate in the molding operation. The separated sheets are held fast only on the frame $a'$ of the slab $a$ and can be separated therefrom by the action of the burner $n$. According as the slab $a$, the preliminary mold $f$, with its bottom $f'$, and the finishing-mold are triangular, quadrangular, or polygonal there will be formed at one blowing three, four, or more glass sheets.

In place of a slab $a$ there may be employed, as seen in Fig. 9, a frame $p$, which holds the sheet of soft glass. Upon this frame there may be laid in order to obtain the necessary pressure either a wet cover or air-tight cover $r$, connected with the air or gas pipes. The cover is constructed of asbestos. With this apparatus there may be made glass surfaces with patterns in stripes, ribs, &c. For this purpose the inner surfaces of the preliminary mold $f$ may be made with corresponding patterns in intaglio. In this mold there may be thus made a hollow body having the desired pattern and which may be elongated by blowing and pulling. It is possible to reverse the entire process as above described by blowing from below upward and elongating the hollow glass body upward instead of downward.

What I claim as my invention, and desire to secure by Letters Patent of the United States, is—

1. The apparatus for the manufacture of hollow objects from sheets of plastic glass, consisting of a plate adapted to receive the plastic material, a frame to hold the edges of the plastic sheet cast thereon, means for introducing a gas under pressure, and a preliminary mold having a bottom plate whose rim is provided with a groove into which the plastic mass is driven in the preliminary blowing, which plate is rotatable about its vertical axis, and means for imparting both the vertical and rotary movements, substantially as described.

2. The improved apparatus for the purpose specified, comprising the plate whereon the molten mass is received, said plate being rotatable on its horizontal axis so that its upper side may become the under one, means for confining the edge of the mass and for applying heat thereto to preserve a duly molten state, means for introducing through the plate gas under pressure for expanding the mass positively, a second plate which is rotatable and vertically movable, and arranged below and parallel to the first-named one, means for securing the glass sheet at its rim to the second plate, a molding-body arranged between the two plates, and means for applying both a downward and rotary movement to the lower plate, whereby the glass sheet is pulled, twisted, and expanded, as described.

In testimony whereof I have signed my name to this specification in the presence of two subscribing witnesses.

PAUL THEODOR SIEVERT.

Witnesses:
PAUL E. SCHILLING,
PAUL ARRAS.